US008650562B2

(12) United States Patent
Hou et al.

(10) Patent No.: US 8,650,562 B2
(45) Date of Patent: Feb. 11, 2014

(54) METHOD AND APPARATUS FOR SCALABLE MONITORING OF VIRTUAL MACHINE ENVIRONMENTS COMBINING BASE VIRTUAL MACHINE AND SINGLE MONITORING AGENT FOR MEASURING COMMON CHARACTERISTICS AND INDIVIDUAL VIRTUAL MACHINES MEASURING INDIVIDUALIZED CHARACTERISTICS

(75) Inventors: Kai-Yuan Hou, Hawthorne, NY (US); Hai Huang, Marion, OH (US); Yaoping Ruan, White Plains, NY (US); Sambit Sahu, Mahopac, NY (US); Anees A. Shaikh, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 573 days.

(21) Appl. No.: 12/483,281

(22) Filed: Jun. 12, 2009

(65) Prior Publication Data
US 2010/0318990 A1 Dec. 16, 2010

(51) Int. Cl.
*G06F 9/455* (2006.01)
*G06F 3/00* (2006.01)
*G06F 13/28* (2006.01)

(52) U.S. Cl.
USPC .................................. 718/1; 710/15; 710/22

(58) Field of Classification Search
USPC ........................................................ 718/1
See application file for complete search history.

(56) References Cited

U.S. PATENT DOCUMENTS 7,861,244 B2 * 12/2010 Vasile ............................... 718/1
2002/0152305 A1 * 10/2002 Jackson et al. ................ 709/224
(Continued)

FOREIGN PATENT DOCUMENTS

CN 101059768 10/2007

OTHER PUBLICATIONS

Google Dictionary Definition for "Infrared," Dec. 30, 2011.*
(Continued)

*Primary Examiner* — Lewis A Bullock, Jr.
*Assistant Examiner* — Kevin X Lu
(74) *Attorney, Agent, or Firm* — Gibb & Riley, LLC

(57) ABSTRACT

A method monitors machine activity of multiple virtual computing devices operating through at least one physical computing device by running a monitoring agent. The monitoring agent monitors performance of the multiple virtual computing devices. The method measures simple operating characteristics of only a base level virtual computing device. The method monitors complex operating characteristics using the monitoring agent by: measuring the complex operating characteristics for each of the multiple virtual computing devices (using each of the multiple virtual computing devices); recording the complex operating characteristics of each of the multiple virtual computing devices on a corresponding memory page of each of the multiple virtual computing devices; and sharing each the corresponding memory page with the base level virtual computing device through an interdomain communications channels to transfer the complex operating characteristics to the monitoring agent. The method identifies simple events and complex events for each of the multiple virtual computing devices by evaluating the simple operating characteristics and the complex operating characteristics and outputs the simple events and the complex events for each of the multiple virtual computing devices.

20 Claims, 5 Drawing Sheets

(56) References Cited

U.S. PATENT DOCUMENTS

| | | |
|---|---|---|
| 2003/0037089 A1* | 2/2003 | Cota-Robles et al. ............ 709/1 |
| 2005/0262181 A1 | 11/2005 | Schmidt et al. |
| 2006/0059253 A1* | 3/2006 | Goodman et al. ............ 709/223 |
| 2006/0271827 A1* | 11/2006 | Cascaval et al. ................ 714/39 |
| 2007/0061441 A1 | 3/2007 | Landis et al. |
| 2007/0067435 A1* | 3/2007 | Landis et al. ................. 709/224 |
| 2007/0192329 A1* | 8/2007 | Croft et al. ...................... 707/10 |
| 2008/0040715 A1* | 2/2008 | Cota-Robles et al. ............ 718/1 |
| 2008/0163205 A1* | 7/2008 | Bennett et al. .................... 718/1 |
| 2009/0063665 A1 | 3/2009 | Begepalli et al. |
| 2009/0063806 A1 | 3/2009 | Logan et al. |
| 2009/0187698 A1* | 7/2009 | Serebrin .......................... 711/6 |

OTHER PUBLICATIONS

PCT Written Opinion Dated Aug. 5, 2010, PCT/US/10/38242, pp. 1-12.

* cited by examiner

METHOD AND APPARATUS FOR SCALABLE MONITORING OF VIRTUAL MACHINE ENVIRONMENTS COMBINING BASE VIRTUAL MACHINE AND SINGLE MONITORING AGENT FOR MEASURING COMMON CHARACTERISTICS AND INDIVIDUAL VIRTUAL MACHINES MEASURING INDIVIDUALIZED CHARACTERISTICS

BACKGROUND

1. Field of the Invention

The embodiments of the invention generally relate to agents that monitor operations of virtual machines and, more specifically, to an apparatus and method that utilizes a single agent to monitor multiple virtual machines.

2. Description of the Related Art

Virtualization technology is being adopted by service providers at their data centers for the several benefits it provides, including IT optimization, flexible resource management, etc. Generally speaking, virtualization is a broad concept that is commonly associated with partitioning of real (physical) data processing resources; i.e., making a single data processing resource, such as a server, data storage device, operating system, or application, appears to function as multiple logical or virtual resources. The concept is broad enough to also include aggregation of real data processing resources; i.e., making multiple physical resources, such as servers or data storage devices, appear as a single logical resource.

There is a growing trend in this direction where services are hosted on a virtualized platform (i.e., where the server, storage, and network resources are virtualized, and applications are deployed on top these virtualized resources instead of dedicated physical resources). In such environments, it is important to monitor these virtual resources to ensure that services are running properly and to identify errors/problems in the early stages.

SUMMARY

In order to address these issues, disclosed herein is a device for monitoring machine activity of multiple virtual computing devices. The embodiments herein have at least one physical computing device, which includes at least one processor, at least one storage medium, and at least one input/output interface. A hypervisor (that comprises a layer of software running between hardware of the physical computing device and an operating system of each virtual computing device), provides an illusion of the multiple virtual computing devices from the (potentially single) physical computing device. These virtual computing devices include a base level virtual computing device and other multiple virtual computing devices.

The embodiments herein include a monitoring agent operating only on the base level virtual computing device through the hypervisor. The base level virtual computing device operates through the hypervisor of the physical computing device.

One way in which the monitoring agent collects data and monitors the performance of the multiple virtual computing devices is by measuring simple operating characteristics of only the base level virtual computing device and inferring the simple operating characteristics of the multiple virtual computing devices using the measure from the base level virtual computing device. These "simple operating characteristics" comprise operating characteristics that are similar for the base level virtual computing device and the multiple virtual computing devices. For example, the simple operating characteristics comprise hardware measures of the physical computing device, and resource allocations which are shared (but are potentially different) by all virtual machines on the same host.

Embodiments herein also include an interdomain communications channel between the base level virtual computing device and the multiple virtual computing devices. The interdomain communications channel is used to gather information from the multiple virtual computing devices and allow the monitoring agent to monitor complex operating characteristics.

One way in which the interdomain communications channel is used is with a memory page. A memory page is maintained within each of the multiple virtual computing devices and is shared with the base level virtual computing device through the interdomain communications channel. Each of the multiple virtual computing devices measures their own complex operating characteristics. The complex operating characteristics comprise operating characteristics that are not similar for the base level virtual computing device and the multiple virtual computing devices. Further, each of the multiple virtual computing devices records their complex operating characteristics on their corresponding memory page. Also, each of the multiple virtual computing devices shares each corresponding memory page with the base level virtual computing device through the interdomain communications channels to transfer the complex operating characteristics to the monitoring agent.

The monitoring agent identifies simple events and complex events for each of the multiple virtual computing devices by evaluating the simple operating characteristics and the complex operating characteristics. The input/output interface outputs the simple events and the complex events for each of the multiple virtual computing devices.

Embodiments herein also include a computer-implemented method for monitoring machine activity of the multiple virtual computing devices that are operating through the physical computing device. The method embodiments herein run a monitoring agent on the base level virtual computing device through the hypervisor of the physical computing device. The monitoring agent collects data and monitors the performance of the multiple virtual computing devices and, as described above, the hypervisor comprises a layer of software running between hardware of the physical computing device and an operating system of each virtual computing device so as to provide an illusion of the multiple virtual computing devices from the physical computing device.

The method embodiments herein measure simple operating characteristics of only the base level virtual computing device and infer the simple operating characteristics of the multiple virtual computing devices using the measure from the base level virtual computing device. Again, the simple operating characteristics comprise operating characteristics that are similar for the base level virtual computing device and the multiple virtual computing devices.

Embodiments herein monitor complex operating characteristics using the monitoring agent by creating an interdomain communications channel between the base level virtual computing device and the multiple virtual computing devices to gather information from the multiple virtual computing devices.

The embodiments herein allocate a memory page within each of the multiple virtual computing devices that is shared with the base level virtual computing device through the interdomain communications channel and measure the complex operating characteristics for each of the multiple virtual computing devices using each of the multiple virtual computing devices. Again, the complex operating characteristics comprise operating characteristics that are not similar for the base level virtual computing device and the multiple virtual computing devices. The embodiments herein record, using each of the multiple virtual computing devices, the complex operating characteristics of each of the multiple virtual computing devices on a corresponding memory page of each of the multiple virtual computing devices. Each corresponding memory page is shared with the base level virtual computing device through the interdomain communications channels to transfer the complex operating characteristics to the monitoring agent.

More specifically, the simple operating characteristics include, for example, the processor model of the physical computing device, the processor speed of the physical computing device, the processor busy and idle time of the physical computing device, the input/output traffic statistics of the physical computing device, and/or file system information of the physical computing device. The complex operating characteristics comprise, for example, memory utilization information of each of the multiple virtual computing devices.

The embodiments herein identify simple events and complex events for each of the multiple virtual computing devices by evaluating the simple operating characteristics and the complex operating characteristics using the monitoring agent. The simple events and the complex events for each of the multiple virtual computing devices is output using the monitoring agent.

Rather than using a monitoring agent within each of the multiple virtual computing devices, the embodiments herein position a single monitoring agent only on the base level virtual computing device, and no monitoring agents are positioned on the multiple virtual computing devices.

BRIEF DESCRIPTION OF THE DRAWINGS

The embodiments of the invention will be better understood from the following detailed description with reference to the drawings, which are not necessarily drawing to scale and in which.

DETAILED DESCRIPTION

The embodiments of the invention and the various features and advantageous details thereof are explained more fully with reference to the non-limiting examples that are illustrated in the accompanying drawings and detailed in the following description.

In conventional (non-virtual) monitoring tools (where applications are deployed on dedicated physical resources directly) a monitoring agent is installed on each dedicated physical resource. These dedicated monitoring agents collect and report the desired resource and system level information based on the performance of the physical resource on which they are installed.

Figure 1:
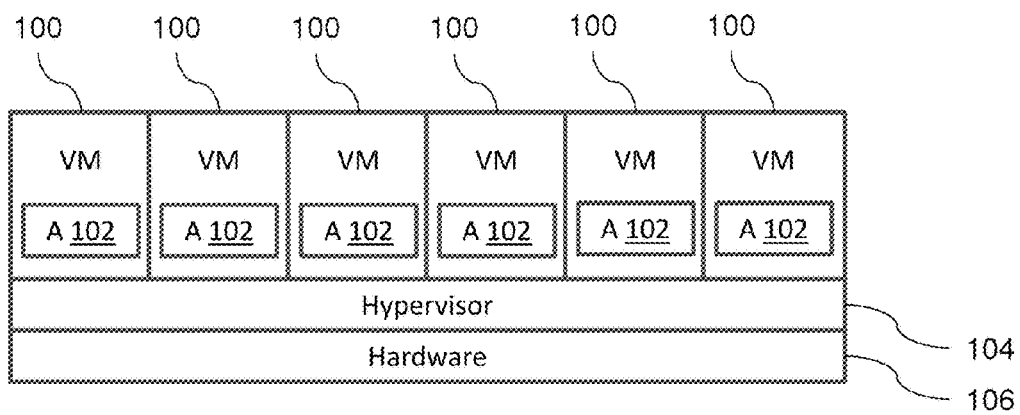
FIG. 1 is a schematic diagram of hardware and virtual machines according to embodiments herein.

As shown in FIG. 1, in a virtualized environment, a layer of software called the hypervisor 104 runs between the hardware 106 and the virtual machine's 100 operating system (OS). The hardware comprises at least one processor, at least one computer storage medium (storage device) at least one input and output or interface, at least one power supply, etc. The hypervisor 104 provides the illusion of the multiple "virtual" machines (VM) 100, which are also called partitions or domains. Each of the virtual machines 100 includes its own operating system and its own applications. For a complete discussion of such a virtualized environment, see U.S. Patent Publication Number 2009/0063806, the complete disclosure of which is incorporated herein by reference.

Figure 2:
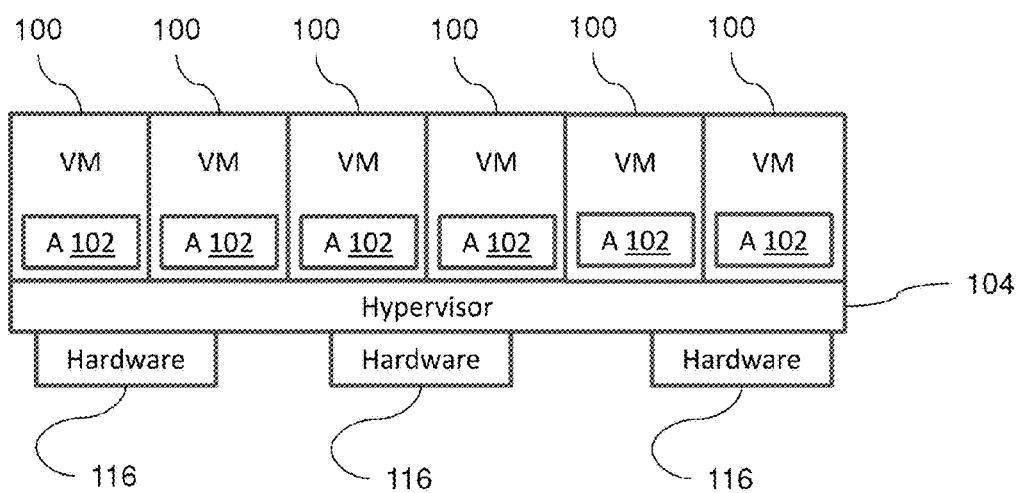
FIG. 2 is a schematic diagram of hardware and virtual machines according to embodiments herein.

As mentioned above, some conventional (non-virtual) platforms install a monitoring agent on each physical server to collect server resource information. Using such a structure for a virtualized environment requires the installation of one monitoring agent per virtual machine. FIG. 1 shows the approach of monitoring each virtual machine 100 using an individual monitoring agent 102 on each virtual machine 100. FIG. 2 illustrates a similar approach where multiple hardware elements 116 are utilized by the hypervisor 104 to support the multiple virtual machines 100.

In the arrangements shown in FIGS. 1 and 2, given that each physical server may comprise hundreds of virtual machines, such an approach leads to excessive overhead to collect the various events of information from each virtual machine. This arrangement is not scalable and the overhead grows quickly as the number of virtual machines increases.

Figure 3:
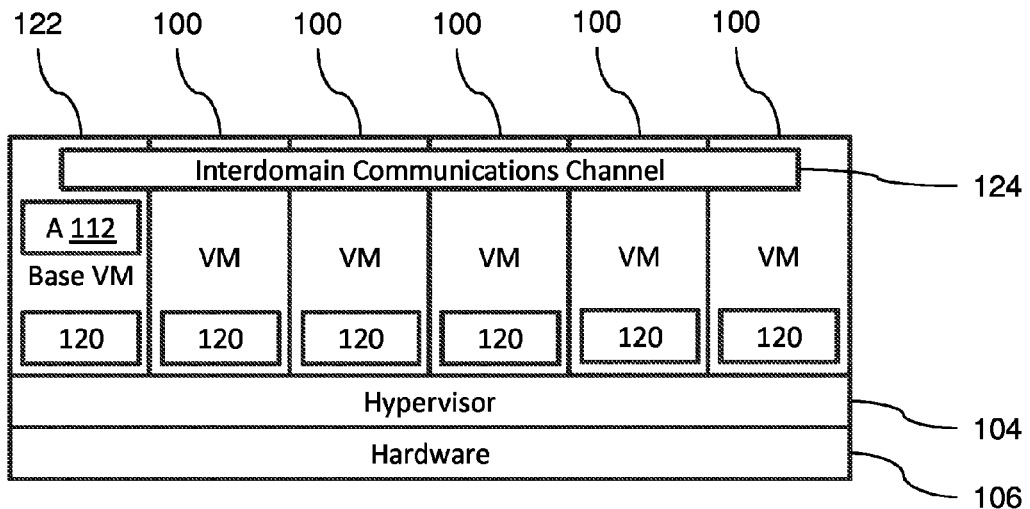
FIG. 3 is a schematic diagram of hardware and virtual machines according to embodiments herein.
Figure 4:
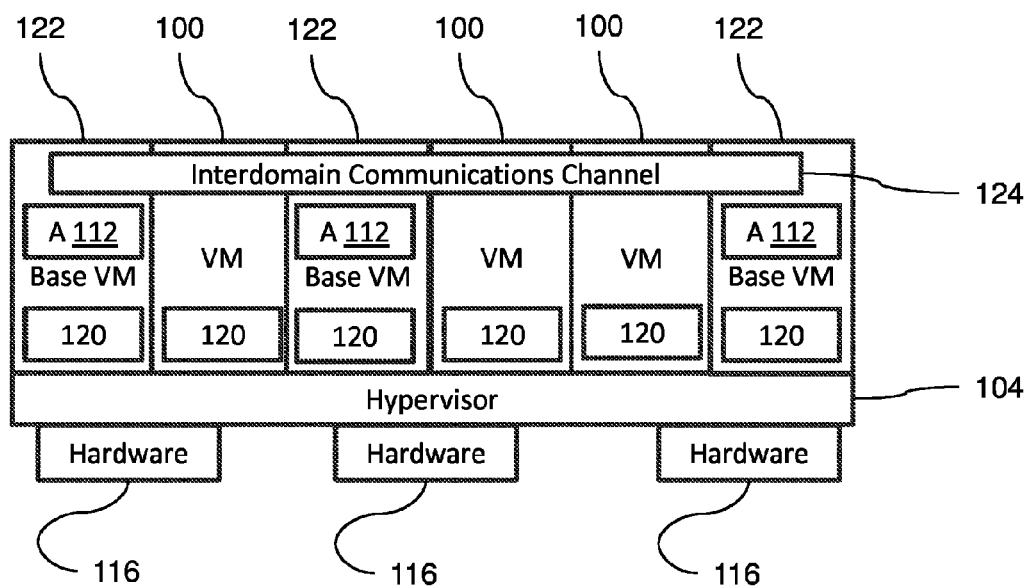
FIG. 4 is a schematic diagram of hardware and virtual machines according to embodiments herein.
Figure 5:
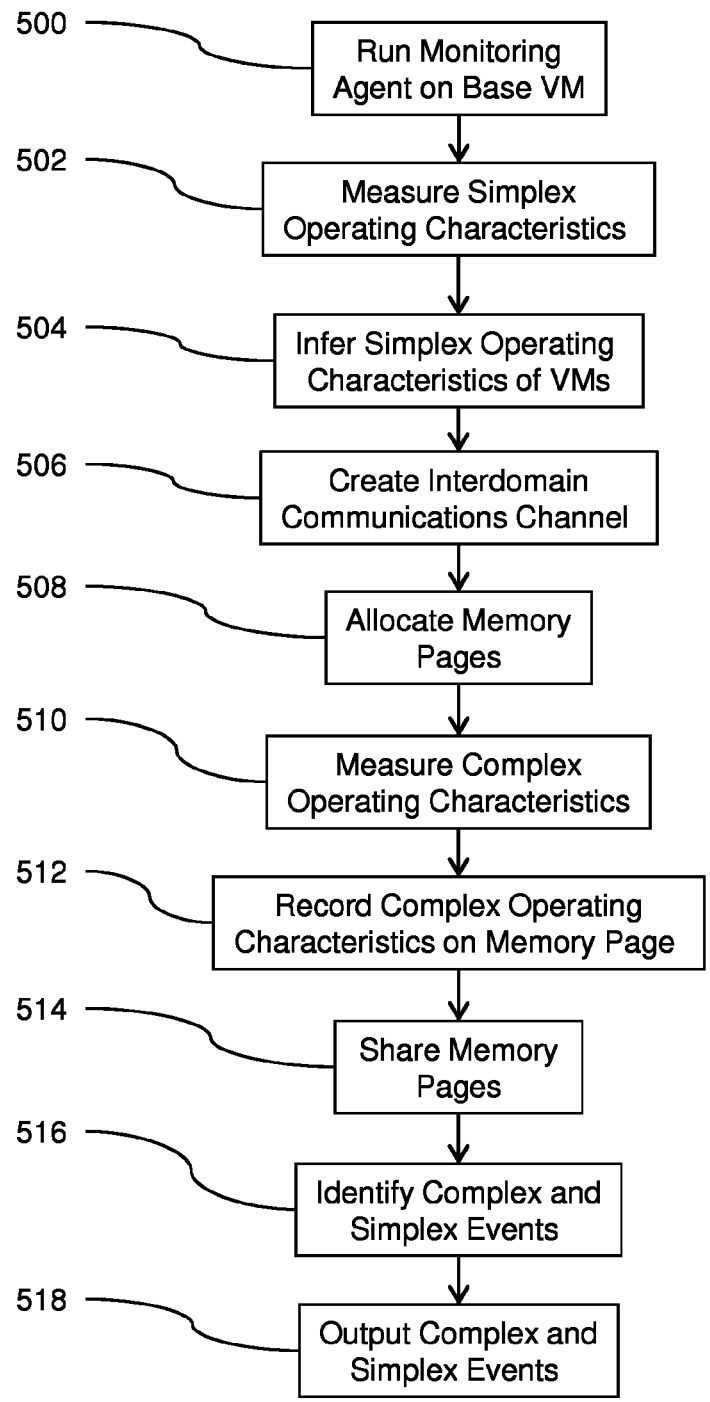
FIG. 5 is a flow diagram illustrating method embodiments herein.

In order to address such issues, the embodiments shown in FIGS. 3-5 provide a method and apparatus to scalably monitor virtual machines in such a virtualized environment using a single monitoring agent 112 that is placed, and is operating on, the base level virtual computing device through the hypervisor 104. Therefore, as shown in FIGS. 3 and 4, each physical device does not need a separate monitoring agent. As the embodiments herein have only one agent 112 that collects events from all the virtual machines 100, they are scalable, robust and simple. Further, the agents mentioned herein do not need to be monitoring agents only. The agents herein could be any data collection software, e.g. one that collects user login for usage charging, one that collects software packages for configuration database, for example. Also, the characteristics collected by the agents herein are not limited to performance data, but can include any type of data.

In FIGS. 3 and 4, at least one of the virtual computing devices is a base level virtual computing device 122. In FIG. 4, because there are multiple hardware devices 116, there can also be multiple base level virtual computing devices 122 (one corresponding to each server or hardware device 116). As shown, the monitoring agent 112 operates on, and as part of the base level virtual computing device 122. The base level virtual computing device 122 operates through the hypervisor 104 of the physical computing device(s) 106, 116.

One way in which the monitoring agent 112 collects data and monitors the performance of the multiple virtual computing devices 100 is by measuring simple (sometimes referred to as "simplex") operating characteristics of only the base level virtual computing device 122 and inferring the simple operating characteristics of the multiple virtual computing devices 100 using the measure from only the base level virtual computing device 122. These "simple operating characteristics" comprise operating characteristics that are similar for the base level virtual computing device 122 and the multiple virtual computing devices 100. For example, the simple operating characteristics comprise hardware measures of the physical computing device(s) 106, 116. In other words, the simple operating characteristics can relate directly to the underlying hardware 106, 116. For example, the simple characteristics include physical configurations which are identical across all virtual machines, and resource allocations which are shared (but are potentially different) by all virtual machines on the same host.

Therefore, by having a single base level virtual computing device 122 monitor the characteristics of the underlying hardware 106, it is unnecessary to provide individual monitoring agents for such hardware within each of the multiple virtual computing devices 100, which provides substantial savings in overhead. Similarly, a single base level virtual computing device 122 can be assigned to each of the underlying hardware devices 116 in systems that utilize multiple servers to provide a similar overhead savings. Because the hardware characteristics will be the same for all virtual machines that rely upon a specific hardware configuration, the simple measurements obtained by the base level virtual computing device can be inferred to all corresponding virtual machines, without loss of accuracy.

Embodiments herein also include an interdomain communications channel 124 between the base level virtual computing device 122 and the multiple virtual computing devices 100. The interdomain communications channel 124 is used to gather information across different domains from the multiple virtual computing devices 100 and allow the monitoring agent 112 to monitor complex operating characteristics.

One way in which the interdomain communications channel 124 is used is with memory pages 120. A memory page 120 is maintained within each of the multiple virtual computing devices 100 and is shared with the base level virtual computing device 122 through the interdomain communications channel 124. Each of the multiple virtual computing devices 100 measures their complex operating characteristics. The complex operating characteristics comprise operating characteristics that are not similar for the base level virtual computing device 122 and the multiple virtual computing devices 100.

Figure 6:
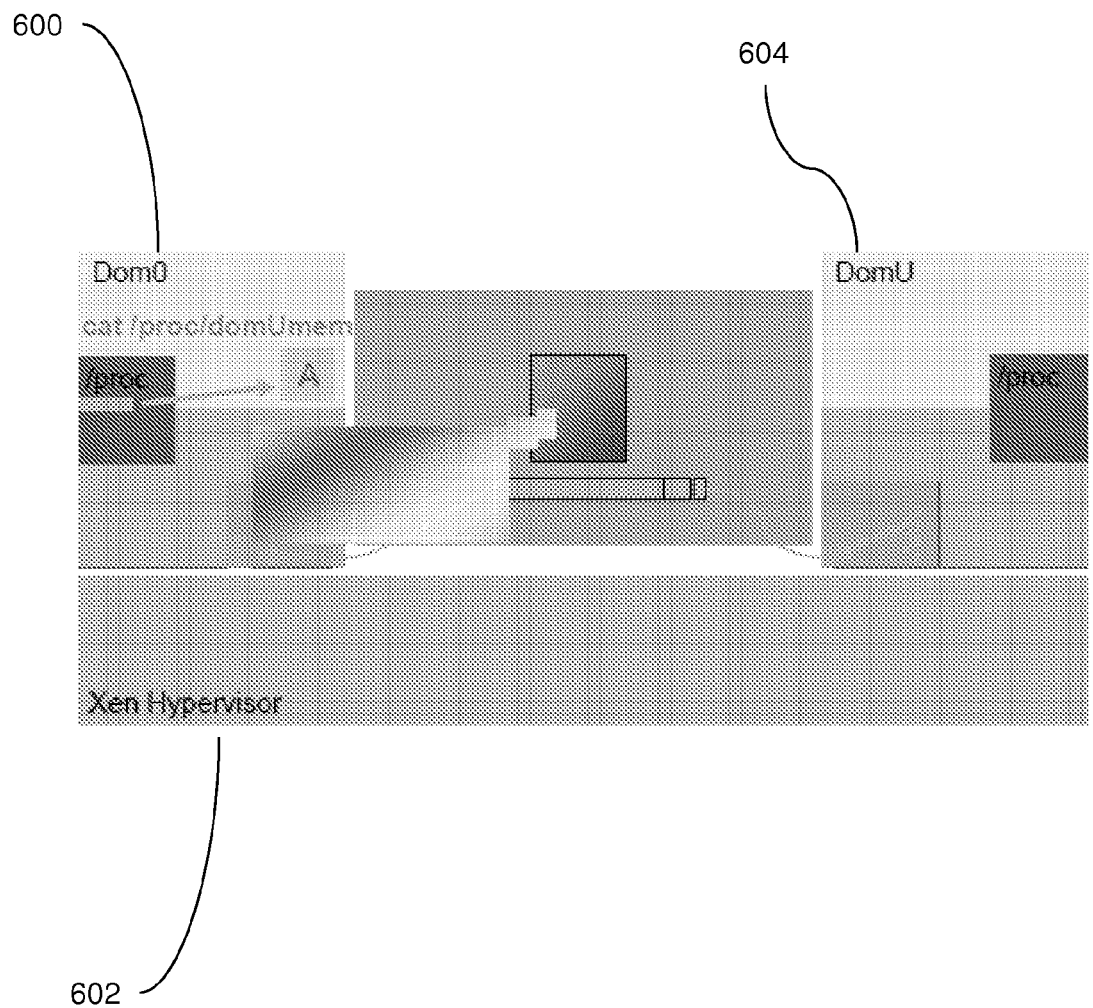
FIG. 6 is a schematic diagram of an interdomain communications channel according to embodiments herein.

Simple characteristics include physical configurations which are identical across all virtual machines, and resource allocations which are shared (but are potentially different) by all virtual machines on the same host. The resource allocations are obtained by the base virtual machine by inference and through multiplexing of activities of each virtual machine. FIG. 6 (discussed in detail below) is an example of such a shared characteristics, where the network inputs and outputs through the virtual network adapters.

More specifically, the simple operating characteristics include, for example, the processor model of the physical computing device, the processor speed of the physical computing device, the processor busy and idle time of the physical computing device, the input/output traffic statistics of the physical computing device, and/or file system information of the physical computing device. The complex operating characteristics comprise, for example, memory utilization information of each of the multiple virtual computing devices.

Further, each of the multiple virtual computing devices 100 records their own complex operating characteristics on their corresponding memory page 120. Also, each of the multiple virtual computing devices 100 shares each corresponding memory page 120 with the base level virtual computing device 122 through the interdomain communications channel 124 to transfer the complex operating characteristics to the monitoring agent 112.

Such memory pages have substantially lower overhead requirements when compared to freestanding independent monitoring agents. Therefore, even though the embodiments herein utilize a memory page within each of these virtual machines, there are substantial overhead savings when memory pages are compared to independent monitoring agents within each virtual machine. These savings, combined with the savings produced by obtaining simple measurements through only the base level virtual computing device provide substantial overhead savings and simplify the structure. The savings in overhead and structure simplification increase the speed, performance, and accuracy of the system without increasing memory or processor requirements.

The monitoring agent 112 identifies simple events and complex events for each of the multiple virtual computing devices 100 by evaluating the simple operating characteristics and the complex operating characteristics. The input/output interface of the hardware 106, 116 outputs the simple events and the complex events for each of the multiple virtual computing devices 100.

As shown in flowchart form in FIG. 5, embodiments herein also include a computer-implemented method for monitoring machine activity of the multiple virtual computing devices that are operating through the at least one physical computing device. The method embodiments herein run a monitoring agent 500 on the base level virtual computing device through the hypervisor of the physical computing device. The monitoring agent collects data and monitors the performance of the multiple virtual computing devices and, as described above, the hypervisor comprises a layer of software running between hardware of the physical computing device and an operating system of each virtual computing device so as to provide an illusion of the multiple virtual computing devices from the physical computing device.

The method embodiments herein measure simple operating characteristics 502 of only the base level virtual computing device and infer the simple operating characteristics of the multiple virtual computing devices using the measure from the base level virtual computing device 504. Again, the simple operating characteristics comprise characteristics that are similar for the base level virtual computing device and the multiple virtual computing devices.

More specifically, embodiments herein monitor complex operating characteristics using the monitoring agent by creating an interdomain communications channel 506 between the base level virtual computing device and the multiple virtual computing devices to gather information from the multiple virtual computing devices. The embodiments herein allocate a memory page 508 within each of the multiple virtual computing devices that is shared with the base level virtual computing device through the interdomain communications channel and measure the complex operating characteristics 510 for each of the multiple virtual computing devices (using each of the multiple virtual computing devices). Again, the complex operating characteristics comprise operating characteristics that are not similar for the base level virtual computing device and the multiple virtual computing devices.

The embodiments herein record, using each of the multiple virtual computing devices, the complex operating characteristics 512 of each of the multiple virtual computing devices on a corresponding memory page of each of the multiple virtual computing devices. Each corresponding memory page is shared with the base level virtual computing device 514 through the interdomain communications channels to transfer the complex operating characteristics to the monitoring agent.

The embodiments herein identify simple events and complex events 516 for each of the multiple virtual computing devices by evaluating the simple operating characteristics and the complex operating characteristics using the monitoring agent. For example, "event" can occur when a certain operational characteristics exceeds certain predetermined boundaries or limits. The simple events and the complex events for each of the multiple virtual computing devices are output 518 using the monitoring agent.

Rather than using a monitoring agent within each of the multiple virtual computing devices, the embodiments herein position a single monitoring agent only on the base level virtual computing device, and no monitoring agents are positioned on the multiple virtual computing devices.

Thus, as shown above, the embodiments herein have one monitoring agent that is installed in the base virtual machine—and have mechanisms that will allows this single monitoring agent to collect useful information about other virtual machines. The following example shall use Xen terminologies and describe the embodiments herein using Xen hypervisor—however the embodiments herein are not limited to any specific virtualization technology. Xen is available from Citrix Systems, Inc., Fort. Lauderdale, Fla., USA http://www.citrixxenserver.com.

The base virtual machine is known as DOM 0 for Xen. There are some challenges that need to be addressed for the base level virtual machine (henceforth referred as DOM 0) to be able to collect information from other virtual machines (DOM1, DOM2, . . . , DOM n). As mentioned above, there are two types of events. Simple events and complex events. Simple events are available to DOM 0 without any additional instrumentations from DOM1, . . . , DOM n. Complex events cannot be accessed directly using available DOM 0 toolings and need additional instrumentations from DOM1, . . . , DOM n.

For example, while simple resource usage (CPU, disk I/O etc) information is available from DOM 0, more detailed /process information (for Linux/Unix) cannot be gathered directly from DOM 0, but instead must be gathered from DOM1, . . . , DOM n. The embodiments herein provide the framework and method to collect such useful information from both DOM 0 and DOM1, . . . , DOM n (within an agent that is installed only in DOM 0) that typical monitoring tools require. The embodiments herein provide the framework and method to collect such information for CPU, memory, disk I/O, network resources using an example for Xen. However, similar mechanisms can be adopted for other virtualization technologies.

While this disclosure describes methods for collecting events from a single agent that is installed on a hypervisor for Xen virtualization technology, the present embodiments are applicable for other virtualization technologies such as VMware, Palo Alto, Calif. (VMware EMC, http://www.vmware.com), p-hypervisor (IBM Corporation, Armonk, N.Y., USA), etc.

As mentioned above, there are simple events and complex events. There is one category of simple event for which information as seen in any one of the virtual machines or kernels (referred to herein as "DomU") is the same as that in Dom0. Hardware configurations fall in this category. For example, a DomU's processor physical configurations including processor model and speed are the same with that of Dom0. The embodiments herein can gather such a category of information in Dom0 and generate report for each of the DomUs according to their different numbers of virtual CPUs. Other simple events comprise information that changes dynamically. Much of such information can be monitored in Dom0. For example, CPU busy and idle time, and network and disk I/O traffic statistics can be monitored in Dom0.

To monitor CPU utilization for guest virtual machines in Dom0, the embodiments herein make use of the tool 'xentop'. The Xen hypervisor keeps track of virtual times for each of the virtual CPU. 'xentop' is a tool which retrieves and reports such CPU utilization information (other hypervisors have similar tools and the invention is applicable to all such systems). In case of multiple virtual CPUs, 'xentop' reports average CPU utilization for all CPUs. In addition to using 'xentop', the embodiments herein can also make use of another tool 'xenmon' in Dom0 to monitor utilization for physical processors.

For monitoring network I/O statistics, the embodiments herein take advantage of Xen's virtual Ethernet architecture. For each of the virtual network interfaces in a DomU, Xen has set up a corresponding virtual interface in Dom0. For example, virtual interface 1.0 (vif1.0 in Dom0) correspond to the ethernet interface number 0 (eth0 in Dom1) as illustrated in FIG. 2, Each 'vif' interface can be connected to the virtual bridge ('xenbr0' in Dom0). The actual physical network interface eth0 is attached to the virtual bridge as well. For an incoming network packet destined for Dom1, the bridge forwards it to vif1.0 and vif1.0 transmits the packet to be received by Dom1's eth0. For an outgoing packet transmitted from Dom4, vif4.0 receives it and forward through the bridge to the outside network. Therefore, the number of packets transmitted by a vif interface equals the number of packets received by its corresponding DomU eth interface, and vice versa.

The embodiments herein make use of common Xen tools including 'ifconfig' (an interface configuration tool) and 'netstat' (a network statistic tool) in Dom0 to obtain network statistics for all DomU's. The information available includes the number of packets/bytes transmitted/received, error rate, drop rate and so on.

Since DomUs' virtual block devices are provided by Dom0, the embodiments herein are also able to monitor disk I/O traffic in Dom0 for all DomU's because 'xentop' reports the number of disk requests per second. To obtain further information, the embodiments herein set up guest virtual machines (based on physical partitions or logical volumes) to make use of 'iostaf' (a Xen input/output statistical tool).

Taking the device dependency information in Dom0's sysfs (a system tool in Xen) combined with virtual block device information available through the 'xm' (a mapping tool in Xen) command, the embodiments herein are able to map DomU's virtual block devices to the partitions or logical volumes as seen in Dom0 and read their corresponding statistics through 'iostaf'.

The embodiments herein also provide for simple events is file system information. By using Xen file system dump tools, such as 'dumpe2fs' for ext2 and ext3 file systems, in Dom0, the embodiments herein are able to obtain guest virtual machine's file system statistics. Information available includes the total size of the file system, the percentage of inodes used, the amount of free space left on the file system, and so on.

For complex events, the embodiments herein incorporate an interdomain communication channel to support Dom0 monitoring agents to conveniently gather information from DomUs'. FIG. 6 illustrates the architecture of the interdomain communication channel.

As shown in FIG. 6, DomU (604) allocates a memory page and shares this page with Dom0 (600). The hypervisor is illustrated as item 602. This shared page will be used as a shared data buffer. The DomU kernel also listens on an event port, waiting for Dom0 to connect and set up the event channel, which will be used to send signals between Dom0 and DomU. In this example, the embodiments herein are focusing on the guest virtual machine's /proc information (specifically, the memory utilization information). The "/proc" information is a series of commands and is sometimes referred to as pick operating system's procedure language or /proc. /Proc is comparable to a UNIX shell script or a DOS/Windows batch file, and has similar features such as control-flow constructs, file manipulation, subroutine calls, and terminal input and output.

A new entry named 'domUmen' is installed in Dom0's /proc. A Dom0 monitoring agent issues a command (e.g., a 'cat' command) on the newly installed /proc entry and triggers the sending of a signal from Dom0 to DomU asking DomU to reflect its memory utilization information in the shared memory page. Upon receiving this signal, a kernel thread in DomU will be activated to pull information from the DomU's /proc and fill the shared memory page with the updated information. The kernel thread then signals Dom0 that the data is up-to-date and is ready for its retrieval. Dom0 module then retrieves information and returns to the monitoring agents.

The embodiments of the invention can take the form of an entirely hardware embodiment, an entirely software embodiment or an embodiment including both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 7:
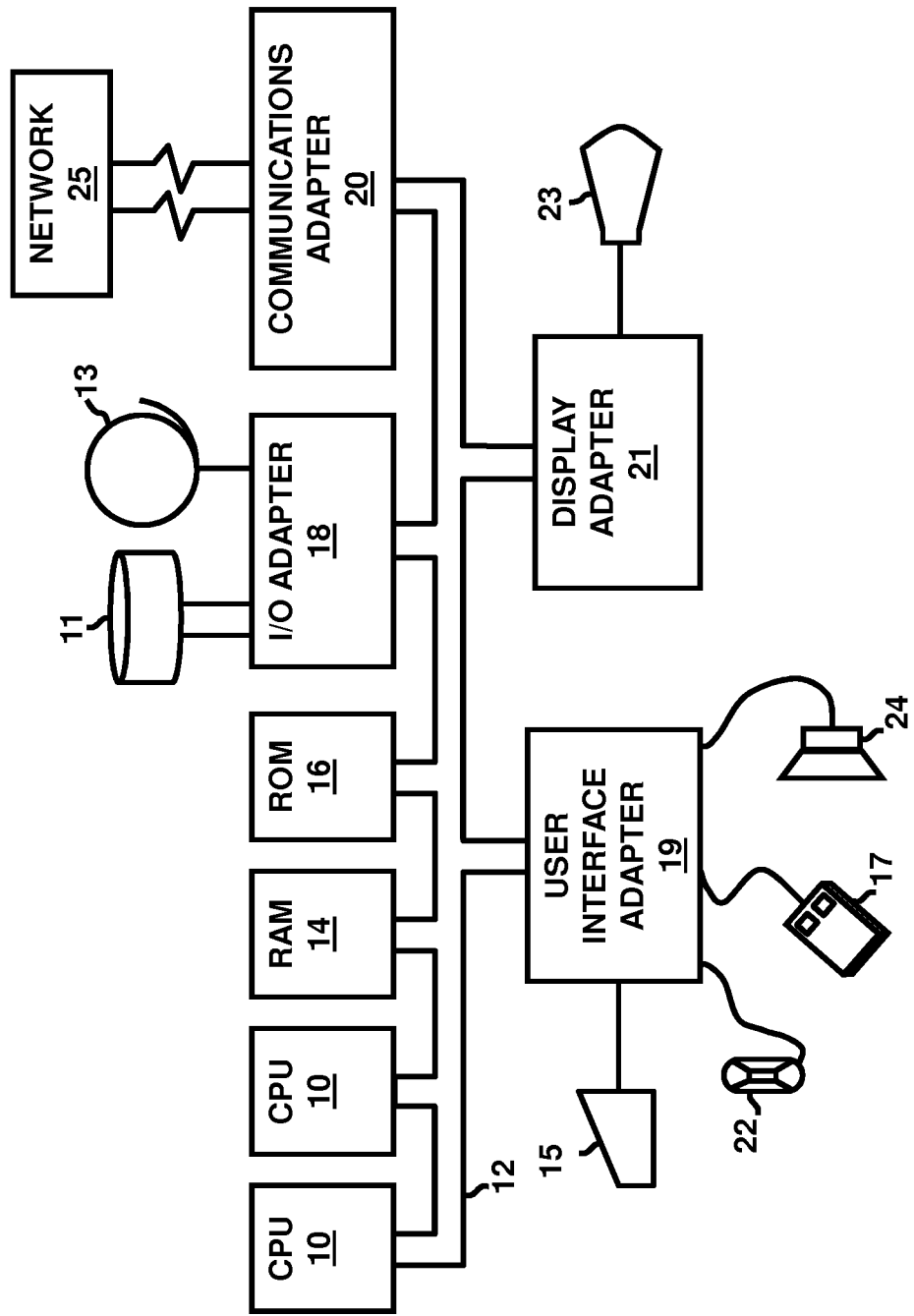
FIG. 7 is a schematic diagram illustrating an exemplary hardware environment that can be used to implement the embodiments of the invention.

A representative hardware environment for practicing the embodiments of the invention is depicted in FIG. 7. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the corresponding structures, materials, acts, and equivalents of all means or step plus function elements in the claims below are intended to include any structure, material, or act for performing the function in combination with other claimed elements as specifically claimed. Additionally, it should be understood that the above-description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. Well-known components and processing techniques are omitted in the above-description so as to not unnecessarily obscure the embodiments of the invention.

Finally, it should also be understood that the terminology used in the above-description is for the purpose of describing particular embodiments only and is not intended to be limiting of the invention. For example, as used herein, the singular forms "a", "an" and "the" are intended to include the plural forms as well, unless the context clearly indicates otherwise. Furthermore, as used herein, the terms "comprises", "comprising," and/or "incorporating" when used in this specification, specify the presence of stated features, integers, steps, operations, elements, and/or components, but do not preclude the presence or addition of one or more other features, integers, steps, operations, elements, components, and/or groups thereof.

What is claimed is:

1. A computer-implemented method for monitoring machine activity of multiple virtual computing devices operating through at least one physical computing device, said method comprising:

running a single monitoring agent on a physical computing device, said single monitoring agent collecting data from said multiple virtual computing devices;

measuring simple operating characteristics of only a base level virtual computing device using said single monitoring agent, said simple operating characteristics comprising operating characteristics that are shared by said base level virtual computing device and said multiple virtual computing devices;

monitoring complex operating characteristics by:
creating an interdomain communications channel between said base level virtual computing device and said multiple virtual computing devices to gather information from said multiple virtual computing devices using said single monitoring agent;
measuring said complex operating characteristics for each of said multiple virtual computing devices using each of said multiple virtual computing devices, said complex operating characteristics comprising operating characteristics that are not shared by said base level virtual computing device and said multiple virtual computing devices;
recording, by each of said multiple virtual computing devices, said complex operating characteristics of each of said multiple virtual computing devices, and
sharing, by each of said multiple virtual computing devices, said complex operating characteristics with said base level virtual computing device through said interdomain communications channels to transfer said complex operating characteristics to said single monitoring agent;

identifying simple events and complex events for each of said multiple virtual computing devices by evaluating said simple operating characteristics and said complex operating characteristics using said single monitoring agent; and outputting said simple events and said complex events for each of said multiple virtual computing devices using said single monitoring agent, said single monitoring agent being positioned only on said base level virtual computing device and no monitoring agents are positioned on said multiple virtual computing devices, and said single monitoring agent comprising the only agent that collects said complex operating characteristics from said virtual computing devices.

2. The method according to claim 1, said simple operating characteristics comprising hardware measures of said physical computing device.

3. The method according to claim 1, said simple operating characteristics comprising at least one of:
a processor model of said physical computing device;
a processor speed of said physical computing device;
processor busy and idle time of said physical computing device;
input/output traffic statistics of said physical computing device; and
file system information of said physical computing device.

4. The method according to claim 1, said complex operating characteristics comprising memory utilization information of each of said multiple virtual computing devices.

5. A computer-implemented method for monitoring machine activity of multiple virtual computing devices operating through at least one physical computing device, said method comprising:
running a single monitoring agent on a base level virtual computing device through a hypervisor of said physical computing device, said single monitoring agent collecting data from said multiple virtual computing devices, said hypervisor comprising a layer of software running between hardware of said physical computing device and an operating system of each virtual computing device, said hypervisor providing an illusion of said multiple virtual computing devices from said physical computing device;

measuring simple operating characteristics of only said base level virtual computing device using said single monitoring agent, said simple operating characteristics comprising operating characteristics that are shared by said base level virtual computing device and said multiple virtual computing devices;

monitoring complex operating characteristics by:
creating an interdomain communications channel between said base level virtual computing device and said multiple virtual computing devices to gather information from said multiple virtual computing devices using said single monitoring agent;
allocating a memory page within each of said multiple virtual computing devices that is shared with said base level virtual computing device through said interdomain communications channel using said single monitoring agent;
measuring said complex operating characteristics for each of said multiple virtual computing devices using each of said multiple virtual computing devices, said complex operating characteristics comprising operating characteristics that are not shared by said base level virtual computing device and said multiple virtual computing devices;
recording, by each of said multiple virtual computing devices, said complex operating characteristics of each of said multiple virtual computing devices on a corresponding memory page of each of said multiple virtual computing devices; and
sharing each said corresponding memory page with said base level virtual computing device through said interdomain communications channels to transfer said complex operating characteristics to said single monitoring agent;

identifying simple events and complex events for each of said multiple virtual computing devices by evaluating said simple operating characteristics and said complex operating characteristics using said single monitoring agent; and outputting said simple events and said complex events for each of said multiple virtual computing devices using said single monitoring agent, said single monitoring agent being positioned only on said base level virtual computing device and no monitoring agents are positioned on said multiple virtual computing devices, and said single monitoring agent comprising the only agent that collects said complex operating characteristics from said virtual computing devices.

6. The method according to claim 5, said simple operating characteristics comprising hardware measures of said physical computing device.

7. The method according to claim 5, said simple operating characteristics comprising at least one of:
a processor model of said physical computing device;
a processor speed of said physical computing device;
processor busy and idle time of said physical computing device;
input/output traffic statistics of said physical computing device; and
file system information of said physical computing device.

8. The method according to claim 5, said complex operating characteristics comprising memory utilization information of each of said multiple virtual computing devices.

9. A device for monitoring machine activity of multiple virtual computing devices, said device comprising:
- at least one physical computing device, said physical computing device comprising at least one processor, at least one storage medium, and at least one input/output interface;
- a single monitoring agent operating through said physical computing device, said single monitoring agent collecting data from said multiple virtual computing devices, said single monitoring agent measuring simple operating characteristics of only a base level virtual computing device, said simple operating characteristics comprising operating characteristics that are shared by said base level virtual computing device and said multiple virtual computing devices; and
- an interdomain communications channel between said base level virtual computing device and said multiple virtual computing devices used to gather information from said multiple virtual computing devices and allow said single monitoring agent to monitor complex operating characteristics;
- each of said multiple virtual computing devices measuring said complex operating characteristics for each of said multiple virtual computing devices, said complex operating characteristics comprising operating characteristics that are not shared by said base level virtual computing device and said multiple virtual computing devices,
- each of said multiple virtual computing devices recording said complex operating characteristics of each of said multiple virtual computing devices,
- each of said multiple virtual computing devices sharing said complex operating characteristics with said base level virtual computing device through said interdomain communications channels to transfer said complex operating characteristics to said single monitoring agent;
- said single monitoring agent identifying simple events and complex events for each of said multiple virtual computing devices by evaluating said simple operating characteristics and said complex operating characteristics,
- said input/output interface outputting said simple events and said complex events for each of said multiple virtual computing devices,
- said single monitoring agent being positioned only on said base level virtual computing device and no monitoring agents are positioned on said multiple virtual computing devices, and
- said single monitoring agent comprising the only agent that collects said complex operating characteristics from said virtual computing devices.

10. The device according to claim 9, said simple operating characteristics comprising hardware measures of said physical computing device.

11. The device according to claim 9, said simple operating characteristics comprising at least one of:
- a processor model of said physical computing device;
- a processor speed of said physical computing device;
- processor busy and idle time of said physical computing device;
- input/output traffic statistics of said physical computing device; and
- file system information of said physical computing device.

12. The device according to claim 9, said complex operating characteristics comprising memory utilization information of each of said multiple virtual computing devices.

13. A device for monitoring machine activity of multiple virtual computing devices, said device comprising:
- at least one physical computing device, said physical computing device comprising at least one processor, at least one storage medium, and at least one input/output interface;
- a hypervisor comprising a layer of software running between hardware of said physical computing device and an operating system of each virtual computing device, said hypervisor providing an illusion of said multiple virtual computing devices from said physical computing device
- a single monitoring agent operating on a base level virtual computing device through said hypervisor of said physical computing device, said single monitoring agent collecting data from said multiple virtual computing devices, said single monitoring agent measuring simple operating characteristics of only said base level virtual computing device, said simple operating characteristics comprising operating characteristics that are shared by said base level virtual computing device and said multiple virtual computing devices,
- an interdomain communications channel between said base level virtual computing device and said multiple virtual computing devices used to gather information from said multiple virtual computing devices and allow said single monitoring agent to monitor complex operating characteristics; and
- a memory page within each of said multiple virtual computing devices that is shared with said base level virtual computing device through said interdomain communications channel,
- each of said multiple virtual computing devices measuring said complex operating characteristics for each of said multiple virtual computing devices, said complex operating characteristics comprising operating characteristics that are not shared by said base level virtual computing device and said multiple virtual computing devices,
- each of said multiple virtual computing devices recording said complex operating characteristics of each of said multiple virtual computing devices on a corresponding memory page of each of said multiple virtual computing devices,
- each of said multiple virtual computing devices sharing each said corresponding memory page with said base level virtual computing device through said interdomain communications channels to transfer said complex operating characteristics to said single monitoring agent;
- said single monitoring agent identifying simple events and complex events for each of said multiple virtual computing devices by evaluating said simple operating characteristics and said complex operating characteristics,
- said input/output interface outputting said simple events and said complex events for each of said multiple virtual computing devices,
- said single monitoring agent being positioned only on said base level virtual computing device and no monitoring agents are positioned on said multiple virtual computing devices, and
- said single monitoring agent comprising the only agent that collects said complex operating characteristics from said virtual computing devices.

14. The device according to claim 13, said simple operating characteristics comprising hardware measures of said physical computing device.

15. The device according to claim 13, said simple operating characteristics comprising at least one of:
- a processor model of said physical computing device;
- a processor speed of said physical computing device;
- processor busy and idle time of said physical computing device;
- input/output traffic statistics of said physical computing device; and
- file system information of said physical computing device.

16. The device according to claim 13, said complex operating characteristics comprising memory utilization information of each of said multiple virtual computing devices.

17. A non-transitory computer storage medium tangibly storing instructions executable by a computer for performing a computer-implemented method for monitoring machine activity of multiple virtual computing devices operating through at least one physical computing device, said method comprising:
- running a single monitoring agent on a base level virtual computing device operating through said physical computing device, said single monitoring agent collecting data from said multiple virtual computing devices;
- measuring simple operating characteristics of only said base level virtual computing device using said single monitoring agent, said simple operating characteristics comprising operating characteristics that are shared by said base level virtual computing device and said multiple virtual computing devices;
- monitoring complex operating characteristics by:
  - creating an interdomain communications channel between said base level virtual computing device and said multiple virtual computing devices to gather information from said multiple virtual computing devices using said single monitoring agent;
  - allocating a memory page within each of said multiple virtual computing devices that is shared with said base level virtual computing device through said interdomain communications channel using said single monitoring agent;
  - measuring said complex operating characteristics for each of said multiple virtual computing devices using each of said multiple virtual computing devices, said complex operating characteristics comprising operating characteristics that are not shared by said base level virtual computing device and said multiple virtual computing devices;
  - recording, by each of said multiple virtual computing devices, said complex operating characteristics of each of said multiple virtual computing devices on a corresponding memory page of each of said multiple virtual computing devices; and
  - sharing each said corresponding memory page with said base level virtual computing device through said interdomain communications channels to transfer said complex operating characteristics to said single monitoring agent;
- identifying simple events and complex events for each of said multiple virtual computing devices by evaluating said simple operating characteristics and said complex operating characteristics using said single monitoring agent; and
- outputting said simple events and said complex events for each of said multiple virtual computing devices using said single monitoring agent,
- said single monitoring agent being positioned only on said base level virtual computing device and no monitoring agents are positioned on said multiple virtual computing devices, and
- said single monitoring agent comprising the only agent that collects said complex operating characteristics from said virtual computing devices.

18. The non-transitory computer storage medium according to claim 17, said simple operating characteristics comprising hardware measures of said physical computing device.

19. The non-transitory computer storage medium according to claim 17, said simple operating characteristics comprising at least one of:
- a processor model of said physical computing device;
- a processor speed of said physical computing device;
- processor busy and idle time of said physical computing device;
- input/output traffic statistics of said physical computing device; and
- file system information of said physical computing device.

20. The non-transitory computer storage medium according to claim 17, said complex operating characteristics comprising memory utilization information of each of said multiple virtual computing devices.

* * * * *